Patented Sept. 29, 1942

2,297,183

UNITED STATES PATENT OFFICE 2,297,183

COMPOSITION FOR WATERPROOFING PERMEABLE MATERIAL

Constantine F. Fabian, Brookfield, and James B. Lee, Danbury, Conn., assignors to Lee Bros. Hats, Inc., Danbury, Conn., a corporation of Connecticut No Drawing. Application October 11, 1939, Serial No. 298,977

7 Claims. (Cl. 106—268)

This invention relates to waterproofing compositions for textiles, felts and other fabricated materials of a more or less permeable nature.

While the invention may be used for the treatment of a wide range of materials, it has special application to the waterproofing of felt hats as well as to other articles formed from animal fiber. It may also be advantageously used in the waterproofing of articles made of other fabricated materials, such, for example, as straw hats.

Water repellant qualities have long been recognized through the use of compositions depending on the presence of an aluminum salt of a fatty acid of high molecular weight such, for example, as aluminum stearate. Such salt is first dissolved with the aid of heat in a volatile hydrocarbon solvent, such as benzol, naphtha or the like, with the resultant formation of a thick amorphous, coagulated, semi-solid gel. Such gel cannot itself be used for water-proofing but must first be dispersed in some kind of a peptizing agent. In its dispersed state the gel forms a pseudo solution or sol, with varying degrees of transparency, viscosity, uniformity and completeness of dispersion and stability. Each of these characteristics, particularly those of completeness, uniformity and stability of dispersion, as well as that of viscosity, is of the greatest importance in producing a practical, effective and satisfactory waterproofing composition. These characteristics have been found to depend largely on the particular dispersing agent employed, the selection of the latter yielding widely different values to the aluminum stearate gel as a waterproofing agent.

In the action of the peptizer on the gel, the molecules of the peptizer, by reason of their capacity to adhere to the molecular surface of the gel, tend to convert the long chain structure of the gel into a structure characterized by shorter chains. The viscosity of the dispersed gel for any given percentage of weight concentration increases with the length of the chain structure, the shorter the chain structure the lower being the viscosity. The type of peptizer determines the length of the chain structure and therefore the physical property of the dispersed gel, and particularly in respect to high or low viscosity.

Various peptizing agents have been proposed, including among them amino compounds, such as ammonia and triethanolamine, carboxylic acids, such as acetic acid, citric acid, tartaric acid, and also monatomic alcohols, such as methyl alcohol, ethyl alcohol and butyl alcohol.

The use of amino compounds as dispersing agents results not only in an undesirably low viscosity in the dispersed aluminum stearate, but especially in a non-uniformity, incompleteness and instability in the dispersion, the dispersed gel being characterized by the formation of insoluble coagulated flakes, the presence of which interferes with the practical treatment of the material to be waterproofed and prevents the development of the waterproofing capacity of the dispersed aluminum stearate. Such peptizers further impart an alkaline reaction to the solution which is detrimental to the color of fabrics or articles which have been dyed, this applying particularly in the case of fur hats which are commonly dyed with acid dyes.

The use of carboxylic acids also results in an undesirably low viscosity and the presence of undispersed flakes which accumulate on or near the surface of the volatile vehicle, interfering with or preventing the practical effective application of the solution to the material to be treated and seriously diminishing the water repellant qualities of the composition. The acidity imparted by such dispersing agents, moreover, is detrimental to the treated material in the case of many articles required to be waterproofed, and particularly when such articles are to be worn in contact with the skin of the wearer.

The use of monatomic alcohols presents great practical difficulty in securing any uniform dispersion of the gel. The addition of alcohol to the gel immediately precipitates white flaky masses. Even when alcohol is added to the gel in successive small amounts, these masses can be dispersed only with the greatest difficulty. If alcohol is added in such considerable amounts as must be resorted to in the preparation of the dispersed gel on a commercial scale, the dispersion of these flaky masses is impracticable, with a resultant coagulation and non-uniformity of dispersion such as to render the composition unusable. A probable explanation of the formation of the white coagulation in the case of monatomic alcohols is the presence of hydroxyl groups which are negatively charged (OH). It is known that particles of colloidal dimensions possess an electric charge,—either positive or negative. In the case of aluminum stearate these particles are positively charged, and by treatment with alcohols having a negative charge the colloidal particles of aluminum stearate are neutralized and coagulated. By increasing the negative charge in the peptizer, as by increasing the number of hydroxyl groups, coagulation is increased. For example, it has been found that the effectiveness of the dispersion is increasingly diminished when the number of hydroxyl groups in the alcohol is increased, as by the use of peptizing agents consisting of glycols and glycerines, dihydric and trihydric alcohols.

We have found that a high viscosity, high stability, and a complete uniformity of dispersion are essential to develop the full water repellant capacity of the dispersed gel when applied to the material to be treated, as well as necessary to the application of the composition on any commercial scale.

One object of the present invention is the provision of a dispersing or peptizing agent for the aluminum stearate gel, providing a high degree of viscosity with complete uniform, stable and permanent dispersion and securing the maximum waterproofing capacity of the dispersed gel.

Another object of the invention is the substantial reinforcement of the water repellant qualities of the aluminum stearate gel by the addition to the dispersed gel of non-oxidizable mineral waxes together with mineral oils.

Another object of the invention is the preservation or intensification of the natural or artificial luster of articles treated by the composition. This luster tends to be appreciably dulled by the action of aluminum stearate gel, and especially when the latter is used in combination with oils or waxes. Furthermore, in the case of colored or dyed articles, the color tends to become dulled due to its increased sensitivity to the action of light. By the use of certain softening or modifying agents in combination with the dispersed gel, the delustering action of the composition is offset, the luster being in fact intensified without diminution of the water repellant action of the gel and the increased sensitivity of color to light otherwise present is absent.

Another object is to impart stiffness to certain treated articles simultaneously with the waterproofing treatment. In the case of articles made of materials of vegetable origin, such, for example, as straw hats, the treatment contemplates not only imparting waterproofing qualities but also a certain degree of stiffness in addition to that naturally possessed by the article. This is made possible by treatment of the articles with a plasticizing agent simultaneously with treatment by the waterproofing composition.

These and other objects of the invention will be best understood by the following description and the accompanying illustrative examples of one or more methods of carrying it into effect.

In carrying out the invention, a gel is first prepared by adding to an aluminum salt of a fatty acid of high molecular weight a suitable amount of liquid vehicle, which is then heated. Fatty acids which are preferred include oleic, stearic and palmatic, the preferred salt being aluminum stearate. From the aluminum salt the gel is prepared by adding thereto a volatile hydrocarbon solvent, such as benzol, naphtha, toluol, xylol, carbontetrachloride or the like, naphtha or benzol being preferred on account of availability. A suitable proportion has been found to be approximately 12 to 15 parts by weight of the liquid vehicle to one part by weight of the aluminum stearate. The addition of the volatile hydrocarbon forms a sol or pseudo solution which, after being heated and stirred, produces a gel appearing in the form of an amorphous semi-solid gelatinous body. To this gel, while still hot, there is added a suitable amount of peptizing agent to effect dispersion of the gel, and the mass is then thoroughly mixed by agitation until dispersion is complete.

It has been found that a full realization of the waterproofing capacity of the aluminum stearate gel, with unusual capacity for the required uniform and stable dispersion of the gel, unlike that resulting from the use of amino compounds, alcohols and acids, may be had by using as a peptizing agent a liquid ester of an organic acid having a relatively low boiling point, such as ethyl acetate, $CH_3.CO_2.C_2H_5$; butyl acetate, $CH_3.CO_2.C_4H_9$; and amyl acetate, $CH_3.CO_2.C_5H_{11}$. Through the use of one or more of such compounds, not containing hydroxyl groups, the viscosity of the dispersed gel can be easily controlled and the dispersed phase of the gel maintained indefinitely in stable form without breakdown, coagulation or precipitation.

The peptizing agent is added to the gel in such proportions as to secure the required viscosity. These proportions will vary with different materials to be treated and with the quantity of the thinning vehicle subsequently employed, as hereinafter described. For example, to produce a relatively thin dispersion, such as would be required for the waterproofing treatment of felt hats, the peptizer may be added in the order of 1 cc. for each 3 to 5 grams of the gel, depending on the thickness and weight of the felt of which the hat is formed. To produce a relatively thicker dispersion, such as would be required for the treatment of straw hats, the peptizer may be added in lesser amounts, such as 1 cc. for each 8 grams of gel.

The dispersed mass of gel (either with or without the addition of the oils, waxes and other substances hereinafter mentioned) is then mixed with a volatile liquid hydrocarbon vehicle to thin the liquid down to a condition adapted for the treatment of the particular article or material to be waterproofed, and depending on the article itself and the degree of waterproofing desired. For such thinning vehicle any suitable volatile hydrocarbon solvent may be employed, such as benzol, xylol, carbontetrachloride, a naphtha of high solvent power, or a mixture of such solvents. Satisfactory naphtha solvents include, for example, those known by the tradenames "Sovasol #5" and "Sovasol #5A," the latter produced by the so-called Houdry process. Preference is given to the use of Sovasol #5, which contains approximately equal proportions of paraffins, naphthenes and aromatics. It may be observed that naphthas which are rich in naphthenes have a low solvency for dispersed aluminum gel, while naphthas whose compositions are balanced or low in aromatics and naphthenes but rich in paraffins provide a high degree of solvency.

Obviously the amount of thinning vehicle employed is subject to wide variation. For such materials as felt, the thinning vehicle may be employed in the proportion of one gallon for each 150 or 160 grams of dispersed gel.

In its thinned condition the liquid composition is ready for application to the materials to be treated, but may be kept standing in its then state without subsequent coagulation of the dispersed gel or other deterioration.

The solution having been thus prepared may be applied to the material to be treated by any method which insures its impregnation throughout the material. This treatment is carried out preferably by the immersion of the material in the solution for a sufficient time to cause the desired degree of penetration. In the case of felt hats, or other articles where it is desired not to add appreciably to their weight, the immersion and impregnation may be followed by removal of the surplus solution through the aid of a centrifugal drier.

We have further found that not only may a remarkable increase be attained in the waterproofing capacity of the aluminum stearate gel by the use in connection with such gel of suitable proportions of mineral oils and waxes, but that through such use certain disadvantages heretofore resulting from the use of oils and waxes alone may be eliminated.

For the waterproofing of articles having physical properties, such as color, luster, etc., mineral oils and waxes have been recognized as superior to vegetable and animal oils and waxes due to reactions, such as oxidation, to which the latter are subject and which result in discoloration and the production of adherent gummy substances.

One objection to the use of mineral or other oils for waterproofing has been an objectionable sweating process under which the oil tends subsequently to be exuded from the waterproofing composition in the form of minute particles, rendering it unsuited for use in connection with articles, the natural feel and appearance of which must be preserved. It has heretofore been recognized that the presence of a mineral wax used in combination with the mineral oil effects a certain binding action on the latter, with the result of eliminating in part this sweating tendency of the oil.

The use of the wax, however, not only fails to avoid wholly the subsequent sweating of the oil, but results in another disadvantage particularly important in the case of finely surfaced articles, in that it imparts to the surface a distinctly waxy or tacky feeling, even in the presence of the oil. Such articles, for example, are felt hats in which we include hats of the type known either as "wool" or "fur." For example, in the case of felt hats which have been waterproofed by treatment with a composition containing mineral oil and ceresin or paraffin, such hats can be readily identified and distinguished from those untreated by any such composition by the mere waxy feel present on the nap.

Through the combination with the dispersed aluminum stearate gel of suitably balanced proportions of mineral oils with mineral waxes, it has been found through extensive comparative tests that the waterproofing capacity of the composition is increased several times that attainable through the use either of the gel without the oils and waxes or of a composition using the oils and waxes without the aluminum stearate. Furthermore, this combination of mineral oils and waxes with the aluminum stearate gel is found to alter the action of the oils and waxes on the fibers and to eliminate not only all evidences of the sweating arising from the oil but all traces of the waxy or tacky feeling heretofore arising from the presence of the wax. Felt hats, for example, which have been waterproofed by the use of aluminum stearate gel, combined with mineral oils and mineral waxes, have no waxy feel and are indistinguishable by the appearance or feel of the nap from those not so waterproofed.

While this phase of the invention is not dependent on any theory, the great increase in the waterproofing capacity of the gel, resulting from the presence of mineral oils and waxes and the altered action of the mineral oils and waxes through the use of the aluminum stearate gel, may be due to the direct action of the unsaturated hydrocarbon constituents of the non-oxidizable mineral oils and waxes on the aluminum stearate gel, with the resultant formation of complex organic compounds which act as water repellant reinforcement.

Where mineral oils and waxes are used in combination with the aluminum stearate gel, they are preferably employed by first melting the wax, adding the oil thereto, stirring the oil and wax together, then adding the resultant mixture to the dispersed gel as soon as the latter has been prepared and while still hot, and before it has been mixed with the thinning liquid, and finally stirring the oil and melted wax with the dispersed gel until a uniform mixture has taken place.

For mineral waxes, ceresin or paraffin are preferably used, better results being found to follow the use of a high grade of ceresin. White ceresin is desirable, particularly in the case of felt hats or other articles having a color or luster which should not be detrimentally affected. Use may be made of any mineral oil, which, however, should preferably be of a highly refined type, of good viscosity, such as that represented by not less than 200 to 300 seconds at 100° F. in Saybolts' apparatus. For treatment of textiles or felts having delicate colors, a petroleum oil refined up to a white color should be employed.

The proportions of oils and waxes to be used may be widely varied, but it has been found in practice that a high intensification of the water repellant capacity of the composition is had and the oil and waxy evidences eliminated by the use of an amount of wax of the order of approximately that of the weight of aluminum stearate employed and an amount of oil substantially less than that of the weight of the wax, as, for example, the use of an amount of oil approximately one-quarter that of the weight of the wax.

In the treatment of materials having either a natural or artificial luster it is usually important that such luster be preserved undiminished. Treatment by the aluminum stearate gel, while effecting a high degree of waterproofing, in the case of many articles, such for example as felt hats, tends to produce a dull appearance, impairing or offsetting the natural luster. The added use of oils and waxes to secure increased water repellant qualities tends further to the dulling of this luster. We have found that by the incorporation in the dispersed gel, either with or without the use of the oils and waxes, of certain compounds, which may be termed softeners or lustering agents, no detrimental effect on the water repellant capacity of the treated material results, while the delustering action of the composition is offset, the natural luster preserved, and such natural luster in most cases intensified and sensitivity of the treated material to light is decreased.

As luster reinforcing agents, use is preferably made of one or more glycols, such as diethylene glycol, ethylene glycol, propylene glycol and butylene glycol. The use of diethylene glycol is preferred where butyl acetate is used as the peptizer. While glycols dissolve with some difficulty in an ester, the glycol may be satisfactorily incorporated by mixture in the aluminum stearate gel which has been dispersed by an ester.

When use is made of such luster reinforcing agent, the latter is added to and thoroughly mixed with the dispersed gel when first prepared and before the dispersed gel is mixed with the thinning vehicle. The amount of such agent required to secure the desired luster reinforcing effect is dependent in part on the amount of aluminum stearate employed to form the gel, and, in the case of the additional use of oil and wax, also on the amounts of the latter ingredients employed. Where an amount of wax is used approximating that of the aluminum stearate and a substantially lesser amount of oil employed, the glycol will be sufficient if added to the dispersed gel in an amount of the order of from 12 to 25% of the weight of the aluminum stearate.

In the treatment of articles requiring a certain artificial stiffness, such, for example, as straw hats, such stiffness may be imparted at one and the same time with the waterproofing treatment by incorporating into the dispersed gel a plasticizer. Numerous plasticizers may be employed for this purpose. Satisfactory results may be secured by using non-oxidizable plasticizers such as tricresyl phosphate, diamyl phthalate, or natural or synthetic resins, as, for example, polymerized vinyl resins, such as that known by the trade-name "Vinylite resin," previously dissolved in acetone or benzol.

The plasticizer may be used in widely varying amounts dependent on the article to be treated and the degree of stiffness desired in the treated material. In the case of treatment of straw hats, for example, an amount of the plasticizer in the order of from 18 to 50% of the weight of the aluminum stearate provides satisfactory results. A plasticizer may be used with the aluminum stearate gel, either with or without the concurrent use of oils and waxes, or the concurrent use of a luster reinforcing agent. Such plasticizer is preferably added to the dispersed gel before the latter has been thinned by the thinning vehicle and is stirred into the gel until a uniform mixture results. The plasticizer dissolves readily in the gel sol, and when the composition is used and the treated article dried, leaves a colorless transparent body, producing a stiffening and hardening effect in the waterproofed material. In the case of a straw hat, the material of the hat is not only rendered waterproof, but at the same time it is stiffened with its assigned shape and form permanently maintained.

The invention may be illustrated by the following specific examples of the preparation of waterproofing compositions according to the general principles of the invention and intended for the production of approximately five gallons of the waterproofing solution, this being more especially designed, except where mentioned, for the waterproofing of felt hats.

In each case there is first prepared a mixture comprising approximately 50 grams of aluminum stearate and 750 grams of benzol or naphtha. This mixture is heated to a practical working temperature, such as one of the order of from 60° to 65° C., while it is constantly stirred until the required gel is formed.

Example 1

To the hot gel is added from 100 to 200 cc. of butyl acetate, depending on the desired viscosity, and this is thoroughly mixed with the gel until complete dispersion occurs.

The dispersed gel is then dissolved in 5 gallons of a thinning liquid consisting of naphtha and carbontetrachloride in the proportion of two parts of naphtha to one part of carbontetrachloride.

The solution is then ready for use in waterproofing treatment.

Example 2

To the hot dispersed gel, as prepared by Example 1, there is added melted ceresin and mineral oil in the amounts of 50 grams of ceresin and 12 grams of mineral oil. This is stirred into the dispersed gel and thoroughly mixed therewith, after which the mixture is dissolved in the thinning liquid, as in Example 1, whereupon the solution is ready for waterproofing.

Example 3

To the dispersed gel, as prepared by any of the preceding examples (with or without use of the oil and wax), and before mixture with the thinning liquid, there is added an amount of from 6 to 12 grams of diethylene glycol, after which the mixture is dissolved in the thinning liquid, whereupon the solution is ready for waterproofing.

Example 4

*(For straw hats)*

To the dispersed gel, as prepared by any of the preceding examples (with or without use of the oil and wax and with or without use of glycol), and before mixture with the thinning liquid, there is added from 9 to 25 grams of diamyl phthalate which is thoroughly mixed with the gel, after which the mixture is dissolved in a thinning vehicle, whereupon the solution is ready for waterproofing.

Example 5

*(For straw hats)*

The waterproofing solution is prepared in the same manner as in Example 4, but with the use of from 5 to 15 grams of vinylite resin previously dissolved in benzol instead of diamyl phthalate.

Various changes in and departures from the embodiments of the waterproofing composition, as herein exemplified, may be made, all within the scope of the generic invention, depending in part on the material to be treated, it being understood that the matter herein set forth is submitted as illustrative and not in a limiting sense.

We claim:

1. A liquid waterproofing composition containing a gel formed from a hydrocarbon vehicle and an aluminum salt of a fatty acid of high molecular weight of the group consisting of oleic acid, stearic acid and palmitic acid, said gel being dispersed by and said composition containing a liquid ester of an organic acid of the group consisting of ethyl acetate, butyl acetate and amyl acetate.

2. The waterproofing composition as defined in claim 1, and containing also a mineral wax and a mineral oil.

3. The waterproofing composition as defined in claim 1, and containing also ceresin wax in an amount approximating the amount by weight of the aluminum stearate, and containing also mineral oil in an amount less than that of the wax.

4. The waterproofing composition as defined in claim 1, and containing also a glycol luster reinforcing agent.

5. The waterproofing composition as defined in claim 1, and containing also a mineral wax, a mineral oil, and a luster reinforcing agent consisting of glycol.

6. The waterproofing composition as defined in claim 1, and containing also a non-oxidizing plasticizing agent.

7. A liquid waterproofing composition containing a gel formed from a hydrocarbon vehicle and an aluminum salt of a fatty acid of high molecular weight of the group consisting of oleic acid, stearic acid and palmitic acid, said gel being dispersed by and said composition containing butyl acetate.

CONSTANTINE F. FABIAN.
JAMES B. LEE.